US008108764B2

(12) United States Patent
Berard et al.

(10) Patent No.: US 8,108,764 B2
(45) Date of Patent: Jan. 31, 2012

(54) DOCUMENT RECOGNITION USING STATIC AND VARIABLE STRINGS TO CREATE A DOCUMENT SIGNATURE

(75) Inventors: Jean-Jacques Berard, Villeurbanne (FR); Stephane Lichtenberger, Tupin et Semons (FR)

(73) Assignee: Esker, Inc., Madison, WI (US)

( * ) Notice: Subject to any disclaimer, the term of this patent is extended or adjusted under 35 U.S.C. 154(b) by 982 days.

(21) Appl. No.: 11/866,423

(22) Filed: Oct. 3, 2007

(65) Prior Publication Data

US 2009/0092320 A1    Apr. 9, 2009

(51) Int. Cl.
G06F 17/00    (2006.01)
(52) U.S. Cl. ........ 715/221; 715/222; 715/243; 715/246; 715/247; 382/175; 382/176; 382/206; 382/209; 382/219; 382/321
(58) Field of Classification Search .................. 715/200, 715/205, 209, 221–226, 234, 243–253, 273–277; 382/173–180, 181, 195, 203, 206, 209, 219, 382/321
See application file for complete search history.

(56) References Cited

U.S. PATENT DOCUMENTS

| | | | |
|---|---|---|---|
| 4,933,979 A * | 6/1990 | Suzuki et al. .................. 382/173 |
| 5,140,650 A | 8/1992 | Casey et al. | |
| 5,182,656 A * | 1/1993 | Chevion et al. ............... 358/452 |
| 5,293,429 A | 3/1994 | Pizano et al. | |
| 5,317,646 A | 5/1994 | Sang, Jr. et al. | |
| 5,434,933 A * | 7/1995 | Karnin et al. .................. 382/317 |
| 5,452,374 A * | 9/1995 | Cullen et al. .................. 382/293 |
| 5,521,991 A * | 5/1996 | Billings ........................ 382/317 |
| 5,666,549 A * | 9/1997 | Tsuchiya et al. .............. 715/223 |
| 5,721,940 A * | 2/1998 | Luther et al. .................. 715/200 |
| 5,793,887 A * | 8/1998 | Zlotnick ....................... 382/209 |
| 5,841,905 A * | 11/1998 | Lee .............................. 382/203 |

(Continued)

FOREIGN PATENT DOCUMENTS

WO    98/47098 A1    10/1998

(Continued)

OTHER PUBLICATIONS

OCE: Digital Invoice Processing (Invoice Capturing). Oce Portfolio, Invoice Center Capture. pp. 1-2. Retrieved from www.odt-oce.com/english/products/invoicecenter_capture.asp on Oct. 2, 2007.

(Continued)

*Primary Examiner* — Cesar Paula
*Assistant Examiner* — James H Blackwell
(74) *Attorney, Agent, or Firm* — Michael Best & Friedrich LLP

(57) ABSTRACT

Systems and methods of recognizing a business document and creating a document signature. In one embodiment, a business document is scanned and a business document image is created. The business document image is compared to a template database. If a matching template is found, document fields are defined and extracted. If no matching document template is found, the document image is compared to a skeleton database. If a matching document skeleton in found, document fields are defined and extracted. A document skeleton is generated and then stored in the template database. If no matching document skeletons are found in the skeleton database, document fields are manually extracted. A document skeleton is then generated from the identification of static and variable strings and stored in the skeleton database. Document fields are validated after all document fields have been extracted.

16 Claims, 16 Drawing Sheets

U.S. PATENT DOCUMENTS

| | | | |
|---|---|---|---|
| 5,850,490 A | 12/1998 | Johnson | |
| 6,188,010 B1* | 2/2001 | Iwamura | 84/609 |
| 6,275,610 B1* | 8/2001 | Hall et al. | 382/180 |
| 6,327,387 B1* | 12/2001 | Naoi et al. | 382/190 |
| 6,353,840 B2 | 3/2002 | Saito et al. | |
| 6,625,313 B1* | 9/2003 | Morita et al. | 382/181 |
| 6,665,839 B1* | 12/2003 | Zlotnick | 715/223 |
| 6,754,385 B2* | 6/2004 | Katsuyama | 382/171 |
| 6,778,703 B1* | 8/2004 | Zlotnick | 382/218 |
| 6,782,144 B2* | 8/2004 | Bellavita et al. | 382/310 |
| 6,886,136 B1* | 4/2005 | Zlotnick et al. | 715/780 |
| 6,950,553 B1* | 9/2005 | Deere | 382/218 |
| 7,003,179 B2* | 2/2006 | Kawaoka et al. | 382/305 |
| 7,106,904 B2* | 9/2006 | Shima | 382/216 |
| 7,142,728 B2* | 11/2006 | Wnek | 382/294 |
| 7,149,347 B1* | 12/2006 | Wnek | 382/159 |
| 7,500,178 B1* | 3/2009 | O'Donnell | 715/221 |
| 7,505,984 B1* | 3/2009 | Nevill-Manning et al. | 1/1 |
| 7,519,226 B2* | 4/2009 | Kaneda et al. | 382/224 |
| 7,551,778 B2* | 6/2009 | Miyatake et al. | 382/180 |
| 7,668,372 B2* | 2/2010 | Schiehlen | 382/176 |
| 7,689,037 B2* | 3/2010 | Handley et al. | 382/173 |
| 2001/0042083 A1* | 11/2001 | Saito et al. | 707/517 |
| 2003/0210428 A1* | 11/2003 | Bevlin et al. | 358/1.18 |
| 2004/0237040 A1* | 11/2004 | Malkin et al. | 715/526 |
| 2005/0131751 A1 | 6/2005 | Ahlers et al. | |
| 2006/0039606 A1* | 2/2006 | Miyatake et al. | 382/189 |
| 2007/0154098 A1* | 7/2007 | Geva et al. | 382/209 |
| 2007/0168382 A1* | 7/2007 | Tillberg et al. | 707/102 |
| 2008/0040660 A1* | 2/2008 | Georke et al. | 715/243 |
| 2009/0092318 A1* | 4/2009 | Berard et al. | 382/176 |

FOREIGN PATENT DOCUMENTS

WO           01/63467 A1     8/2001

OTHER PUBLICATIONS

Ebydos: Invoice Cockpit. Ebydos, Inc., San Francisco, CA. pp. 1-2. Retrieved from www.ebydos.com/files/pdf/Ebydos_FS_Cockpit_us.pdf on Oct. 2, 2007.

* cited by examiner

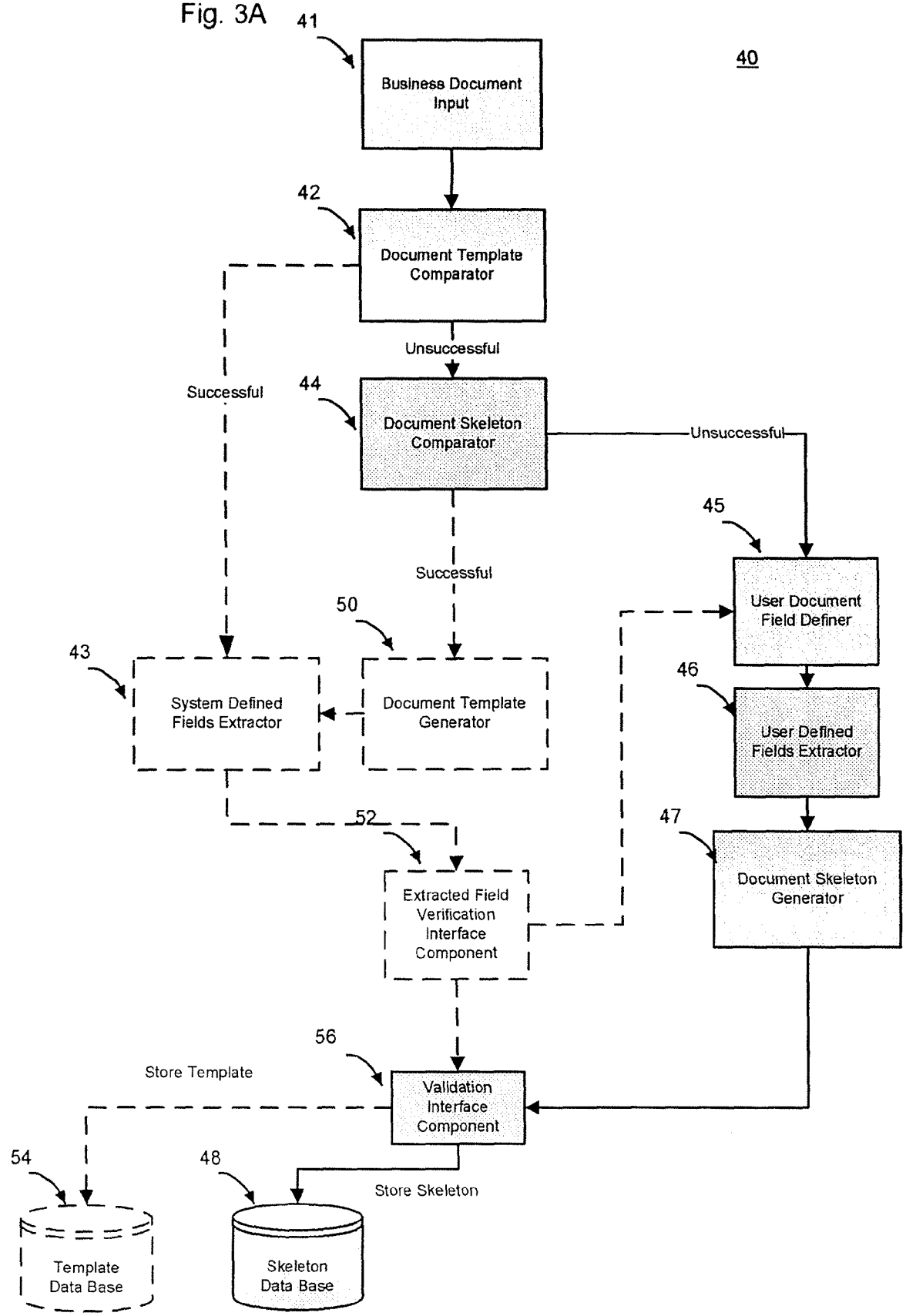

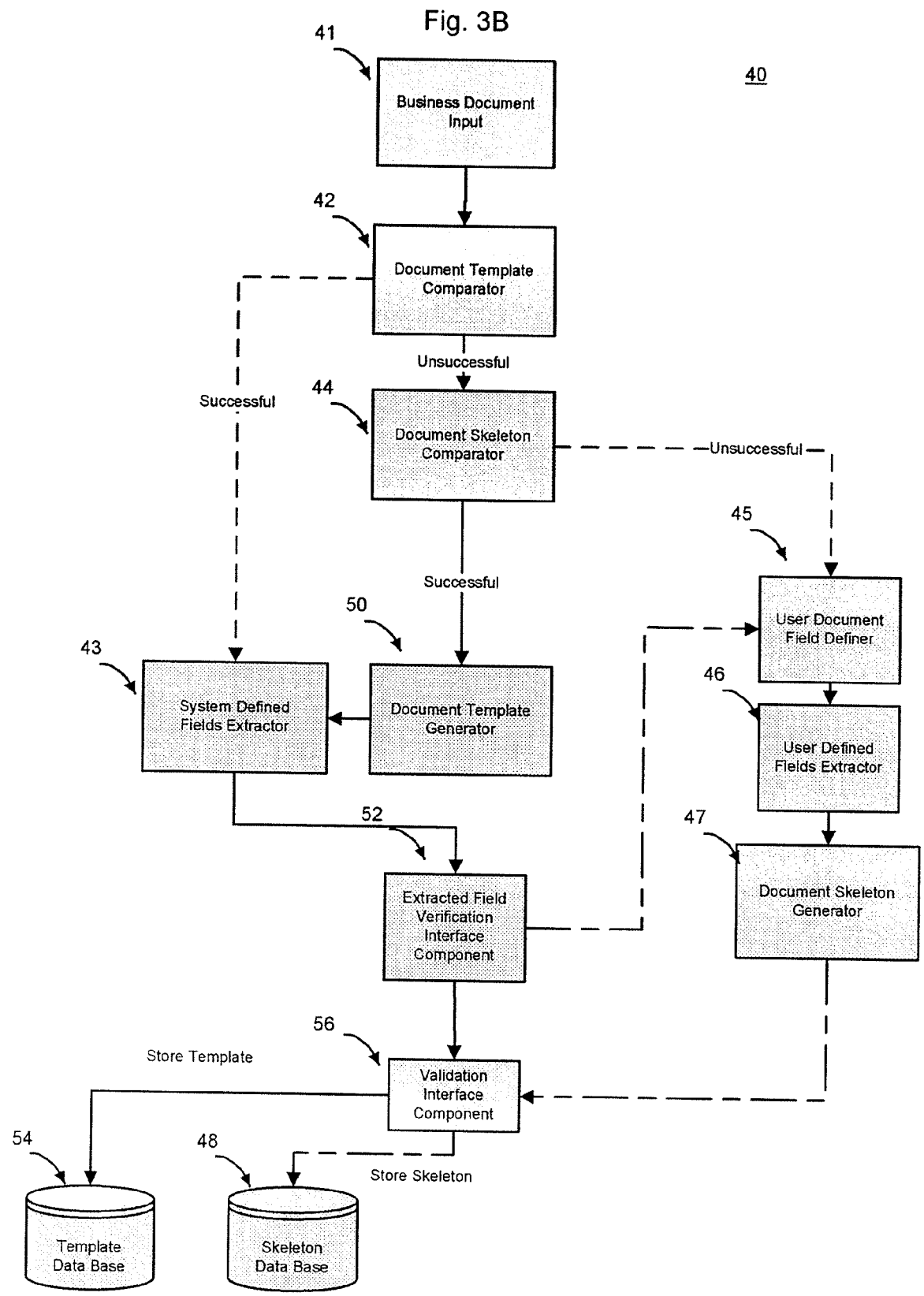

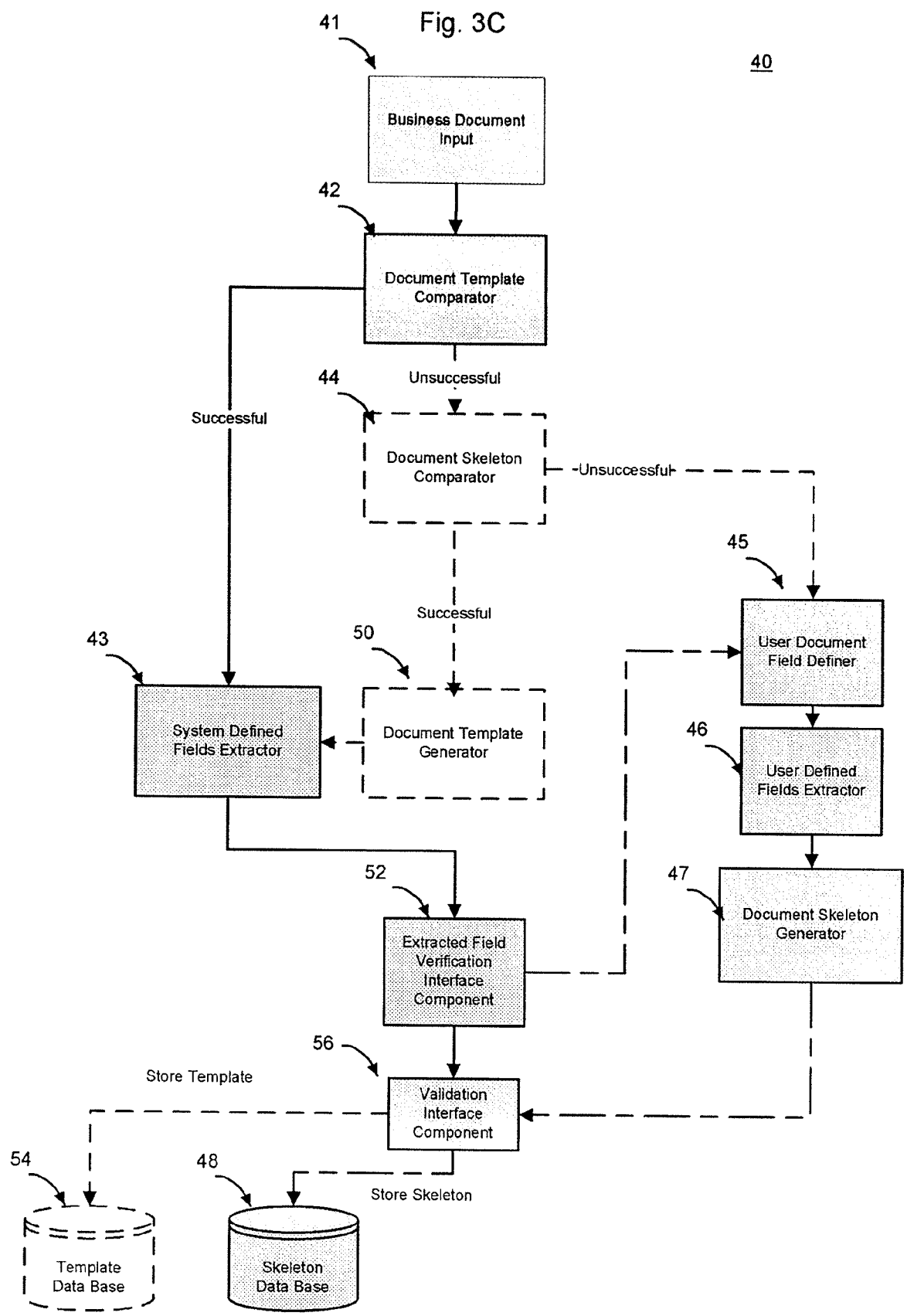

Fig. 7

DOCUMENT RECOGNITION USING STATIC AND VARIABLE STRINGS TO CREATE A DOCUMENT SIGNATURE

BACKGROUND

The present invention relates to document recognition systems. More specifically, embodiments of the present invention relate to a document recognition system that creates a document signature using static and variable strings.

In some instances, document recognition involves reading or scanning a hard-copy document (e.g., a paper document) to generate an image of the document and, thereafter, a computer-based process of analyzing the document image in order to identify the document in some manner. Often, recognition involves analyzing the document to determine whether the document belongs to a previously known type, kind, or class of documents. Document recognition is sometimes implemented as part of a workflow process such as invoice processing.

Efficient document recognition of invoices (or other documents) can reduce the labor costs of a business as well as improve business document processing time and efficiency. A number of methods are currently available for processing business documents. Pattern recognition is one such method. Pattern recognition can include identification of line segments in a document. Optical character recognition (OCR) is related to pattern recognition and can also be used. Regardless of the specific technologies or methodologies employed, current document recognition systems often require large libraries of lookup tables or predefined business documents in order to perform document recognition effectively.

SUMMARY

Although current document recognition technologies are useable, improved recognition systems could decrease the need for large libraries of tables and documents used to perform recognition. Document recognition using static and variable strings to create a document signature can provide a user with a faster, more efficient, and adaptive method of document recognition.

In one embodiment, the invention provides a method of recognizing a business document and creating a document signature by extracting, in a generic sense, static and variable strings from an image of a document. In certain embodiments, special types, combinations, groupings, or instantiations of strings, referred to as "fields," are extracted from a document. For example, a field may be a string that is identified or recognizable as an invoice number, a customer name, a price, or a location in a document or record in which a particular type of data is stored or represented. In one inventive method, manual extraction of static and variable fields is carried out upon the first instance of one type of business document. After such extraction has occurred, a skeleton is created for automatic information extraction of the second instance of one type of business document. After the second extraction, a template for automatic information extraction is created. Upon the first encounter of a business document of a first type, a user manually selects the fields to be extracted. As this is being done, the system identifies which areas or fields of the document are static and which fields of the document are variable. The identified static fields are used to create a "signature." The "signature" is either a skeleton or a template depending on whether the encounter is the first or second instance of the business document type. The document skeleton is stored in a skeleton database and the user selected fields are extracted. On the second encounter of a document, the document skeleton created during the first encounter allows for a set of fields to be automatically extracted. The document skeleton and the second encounter of the business document are compared and (if they match) a document template is created. When future instances of the same business document type are encountered, desired fields are extracted automatically using the document template.

In another embodiment, a document is scanned to create a document image. The document image is compared to a template database. A matching document template is found when the static fields of a document template are substantially similar to the static fields of the document image. After identifying a matching document template, the computer carries out translational corrections and scale corrections on the business document image. Each static field in the document template and the document image is identified with a set of Cartesian coordinates. The smaller of the document template and the business document image is identified as a first result, and the larger of the document template and the business document image is identified as a second result. A translational correction vector is created from the difference between the smallest set of static field coordinates of the second result and the smallest set of static field coordinates of the first result. A scale correction vector is created from the difference between the largest set of static field coordinates of the second result and the largest set of static field coordinates of the first result. The correction vectors are created and applied to each set of Cartesian coordinates during translational correction and scale correction. Using the static fields of the document template, the variable fields of the business document image are automatically extracted. After all document fields have been extracted, they are validated using a validation interface component.

If no matching document template is found, the document image is compared to a skeleton database. A document skeleton is matched to a document image when the static fields of a document skeleton are substantially similar to the static fields of the document image. A document template is generated. Using the static fields of the document skeleton, the variable fields of the document image are automatically defined and extracted. After all document fields have been extracted, they are validated using the validation interface component. The document template is then stored in the document template database.

If no matching document skeletons are found in the skeleton database, document fields are manually defined. As a user manually defines the document fields for extraction, the computer identifies static and variable fields in the document image. A document skeleton is then generated from the identification of the static and variable fields. After all document fields have been extracted, they are validated using the validation interface component. The document skeleton is then stored in the skeleton database.

In another embodiment, the invention provides a method of recognizing a document and creating a document signature based on the identification of a sender ID. If no matching document template is found, the document image sender ID is compared to the sender IDs of the document skeletons in the skeleton database. The sender ID can be entered by a user or automatically retrieved from the document. For example, in a facsimile message, a sender ID could be retrieved automatically using the sender's facsimile number. In which case, a computer could match the facsimile number to an individual or entity by, for example, using a lookup table. A document skeleton is matched to a document image when the sender ID of the document is matched to the sender ID of a document skeleton. If a match is found, a document template is generated. Using the static fields of the document skeleton, the variable fields of the document image are automatically defined and extracted. After all document fields have been extracted, they are validated using the validation interface component. The document template is then stored in the document template database.

In yet another embodiment, the invention provides a document recognition system.

Other aspects of the invention will become apparent by consideration of the detailed description and accompanying drawings.

BRIEF DESCRIPTION OF THE DRAWINGS

FIG. 3A illustrates a process carried out upon the first occurrence of a business document.

FIG. 3B illustrates a process carried out upon the second occurrence of a business document.

FIG. 3C illustrates a process carried out upon a third occurrence of a business document.

FIG. 7 illustrates actions carried out by the computer during translational correction.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
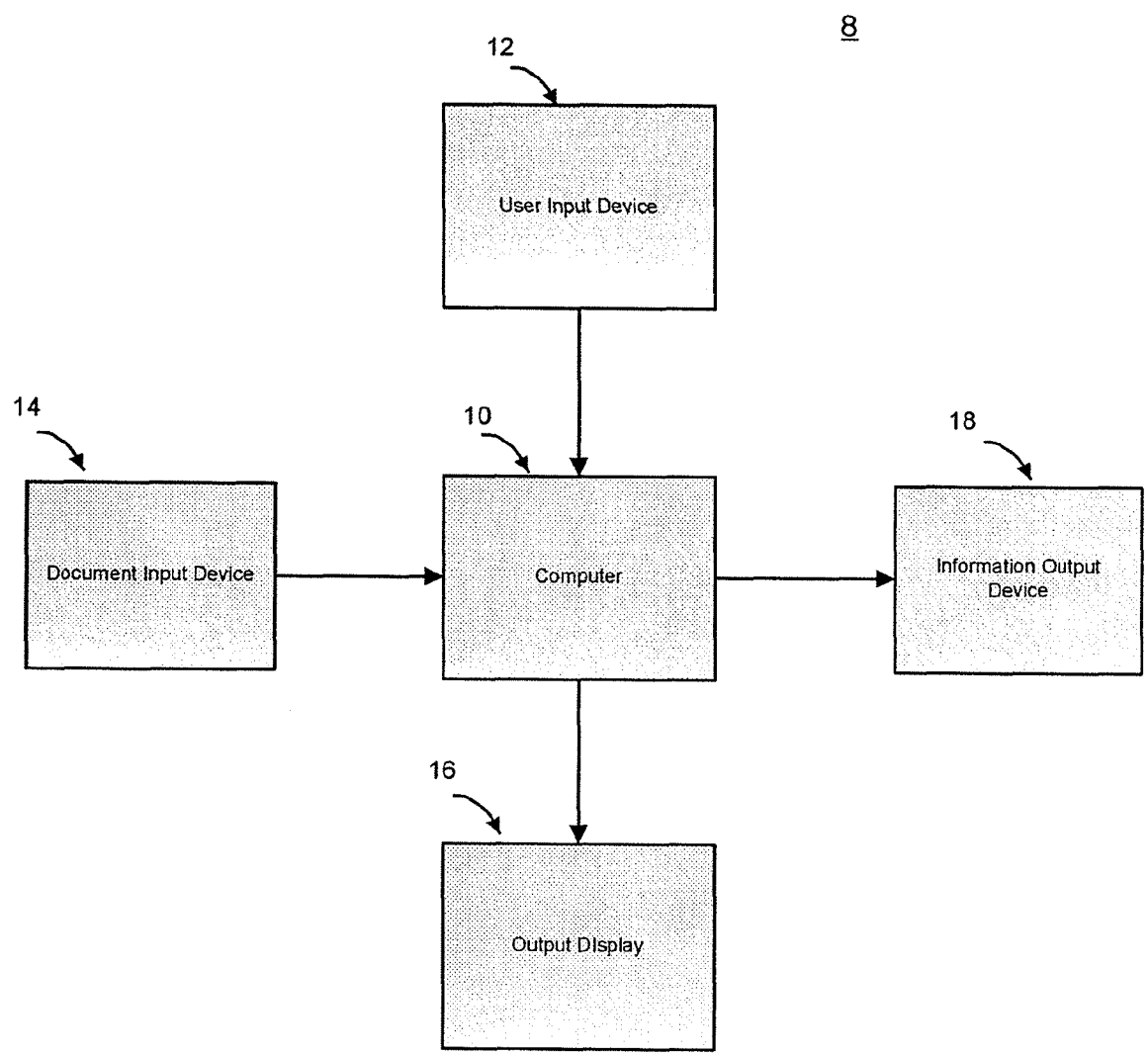
FIG. 1 schematically illustrates a document processing system.

FIG. 1 illustrates a general implementation of a document processing system 8. The document processing system includes a computer 10, a user input device 12, a document input device 14, an output display 16, and an information output 18.

The computer 10 can include memory, a central processing unit (CPU), and an I/O unit for accepting system input information and sending system output information. The computer 10 is capable of running programs by executing computer instructions fetched from memory. The user input device 12 allows a user to control or access information in the computer 10. The document input device 14 captures information from documents (such as an image or OCR data) and transmits that data to the computer 10. The output display 16 displays information to the user. The information output device 18 sends information from the document processing system to other devices connected to the computer 10 via a network.

Figure 2:
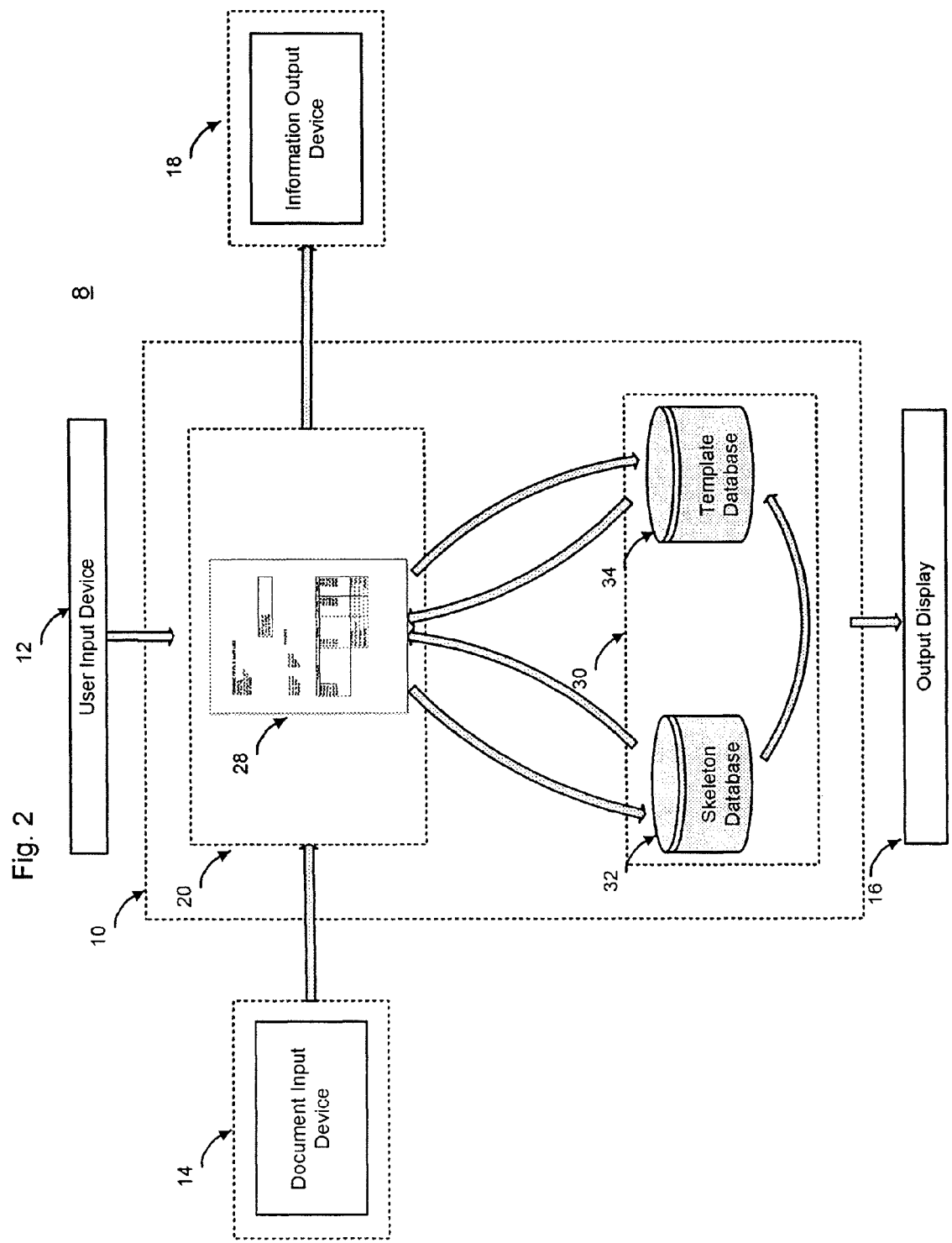
FIG. 2 illustrates a document processing system and the interactions that a computer of the document processing system has with a template database and a skeleton database.

FIG. 2 illustrates the interactions between components of the system 8 when processing a document, which in the illustrated embodiment is a business document, but other types of documents could be processed. As shown in FIG. 2, the CPU 20 and the system memory 30 operate as the computer 10. The document input device 14 scans the business document and generates a business document image 28. The CPU 20 stores the business document image 28 in the system memory 30. The computer 10 searches a template database 34. The template database 34 includes a plurality of document templates. If no matching document template is found, the system 8 searches a skeleton database 32. The skeleton database 32 includes a plurality of document skeletons. The user input device 12 allows the user to define one or more document fields from the business document image 28. The user input device 12 also allows for validation of output information. The output display 16 allows the user to interact with the system 8. The information output device 18 accepts information from the computer 10.

FIGS. 3A, 3B, and 3C illustrate a process 40 carried out by the computer 10. The process 40 depends on the number of times the system 8 has encountered the business document (or business document of a particular type). FIG. 3A illustrates the process 40 for a first occurrence of a business document. FIG. 3B illustrates the process 40 for a second occurrence of a business document. FIG. 3C illustrates the process 40 for a third occurrence of a business document. A "successful comparison" hereinafter refers to a business document image that is substantially similar to a document template or document skeleton. An "unsuccessful comparison" hereinafter refers to a business document image that is not substantially similar to a document template or document skeleton. The term "substantially similar" refers to, in one example, a business document image including more than a user-defined percentage of similar fields for matching with a document skeleton or document template.

In FIG. 3A, the process 40 begins when a business document image 28 is input into the system (step 41). The business document image 28 is then compared in a document template comparator (step 42). If step 42 results in an unsuccessful comparison, the business document image 28 is compared in a document skeleton comparator (step 44). If step 44 results in an unsuccessful comparison, the document fields are defined in a user document field definer (step 45). Then the user defined document fields are extracted in a user defined fields extractor (step 46). After step 46, a document skeleton is generated in a document skeleton generator (step 47). After step 47, the user validates the business document in a user interface using a validation interface component (step 56). Such an interface component may be a GUI component such as a check box, radio button, or the like that provides an input mechanism for the user to indicate that there is an appropriate relationship between the document and the document skeleton. Then the document skeleton is stored in the skeleton database (step 48).

FIG. 3B illustrates the process 40 under circumstances where the skeleton comparison is successful. As described above, the process 40 begins when a business document image 28 is input into the system (step 41). The business document image 28 is then compared in a document template comparator (step 42). If step 42 results in an unsuccessful comparison, the business document image 28 is compared in a document skeleton comparator (step 44). If step 44 results in a successful comparison, then a document template is generated in a document template generator (step 50). The document template is generated from a comparison of one or more static fields in the business document image and the document skeleton. A set of computer-defined document fields are extracted in the computer-defined fields extractor (step 43). The set of extracted document fields are verified using an extracted field verification interface component (step 52). If not all extracted document fields are extracted at the correct position, additional document fields are defined in the user document field definer (step 45). The additional user defined document fields are then extracted in the user defined fields extractor (step 46). After step 46, a new document skeleton is generated in the document skeleton generator (step 47). After step 47, the user validates the business document using the validation interface component (step 56). The new document skeleton is then stored in the skeleton database (step 48). After step 52, if all extracted document fields are extracted at the correct position, the user validates the business document using the validation interface component (step 56). The document template is then stored in a template database (step 54).

FIG. 3C illustrates the process 40 under circumstances where the template comparison is successful. As with the situations described with regard to FIGS. 3A and 3B, steps 41 and 42 are carried out. If step 42 results in a successful comparison, then a set of computer defined document fields are extracted in the computer defined field extractor (step 43). The set of extracted document fields are verified using the extracted field verification interface component (step 52). If not all extracted document fields are extracted at the correct position, additional document fields are defined in the user document field definer (step 45). The additional user defined document fields are then extracted in the user defined fields extractor (step 46). After step 46, a new document skeleton is generated in the document skeleton generator (step 47). After step 47, the user validates the business document using the validation interface component (step 56). The new document skeleton is stored in the skeleton database (step 48). If, after step 52, all extracted document fields are extracted at the correct position, the user validates the business document using the validation interface component (step 56).

Figure 4:
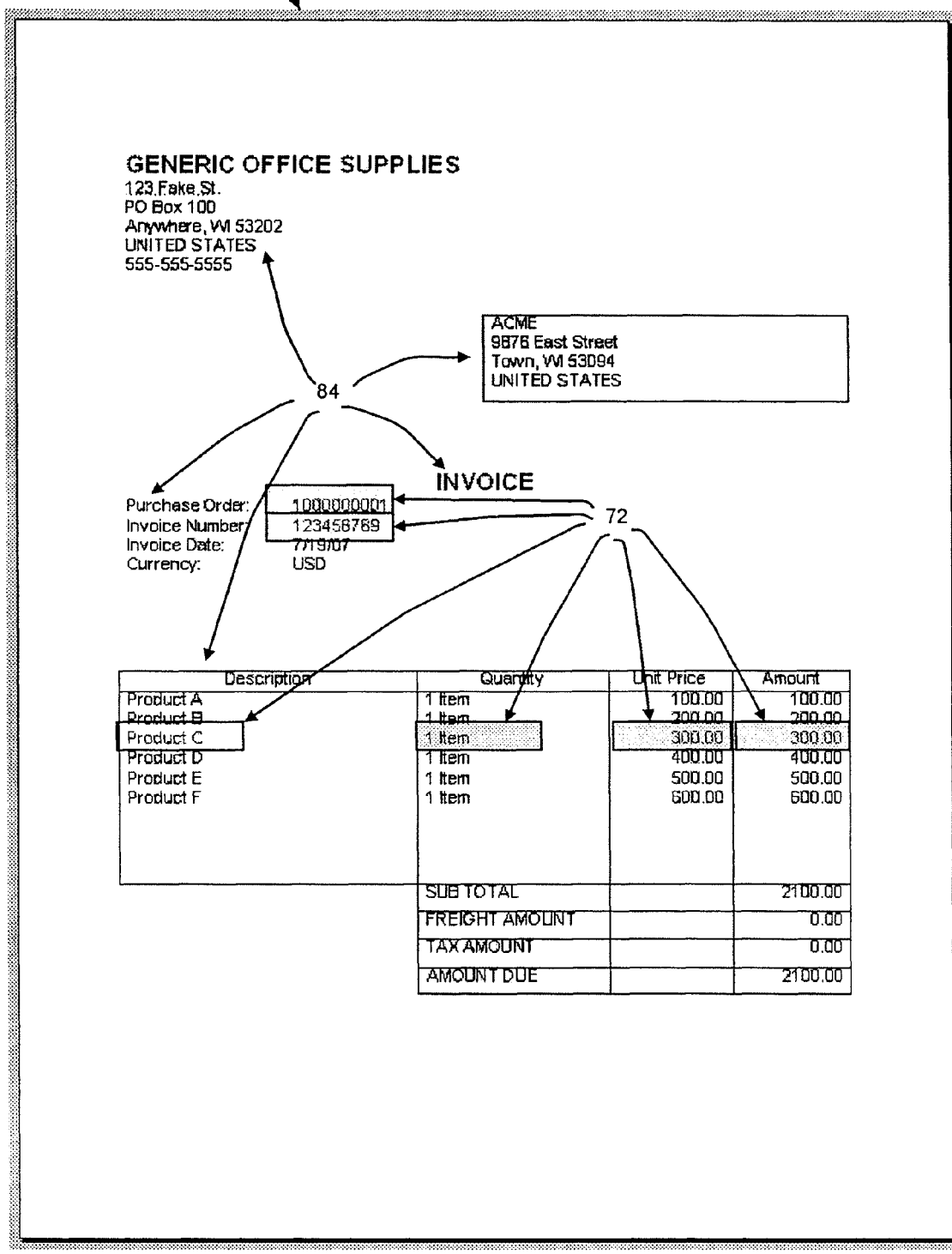
FIG. 4 illustrates actions carried out by a user to define fields for extraction.

FIG. 4 illustrates actions carried out by a user during step 45 of the process 40. The user defines a set of document fields for extraction using graphic user interface components or tools. The business document image 28 (FIG. 2) contains a set of variable fields 72 (i.e., fields that change for each instance of a document). The business document image 28 also contains a set of static fields 84 (i.e., fields that generally stay the same for each instance of a document). In one embodiment, the set of user defined document fields is the set of variable fields 72. As the user defines the set of document fields for extraction, the computer 10 distinguishes between the static fields and the variable fields in the business document image 28. The business document image 28 less the set of variable fields 72 is the set of static fields 84.

Figure 5:
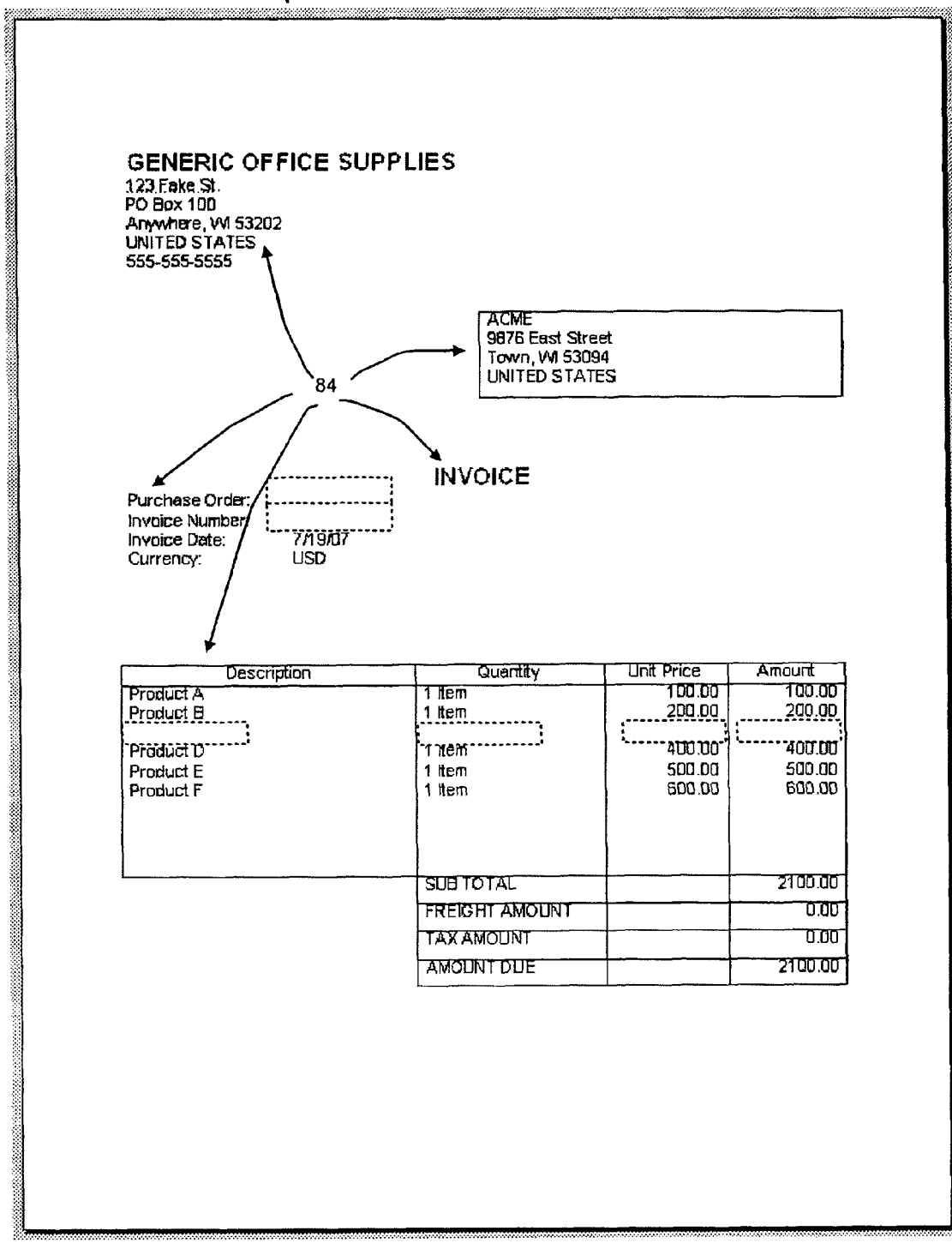
FIG. 5 illustrates a document signature of a business document image.

FIG. 5 illustrates a document signature 92 of the business document image 28 (FIG. 4). The document signature 92 contains only the set of static fields 84. The document signature 92 is treated as a document skeleton if the business document image 28 is the first occurrence of the business document. The document signature 92 is treated as a document template if the business document image 28 is the second occurrence of the business document.

Figure 6:
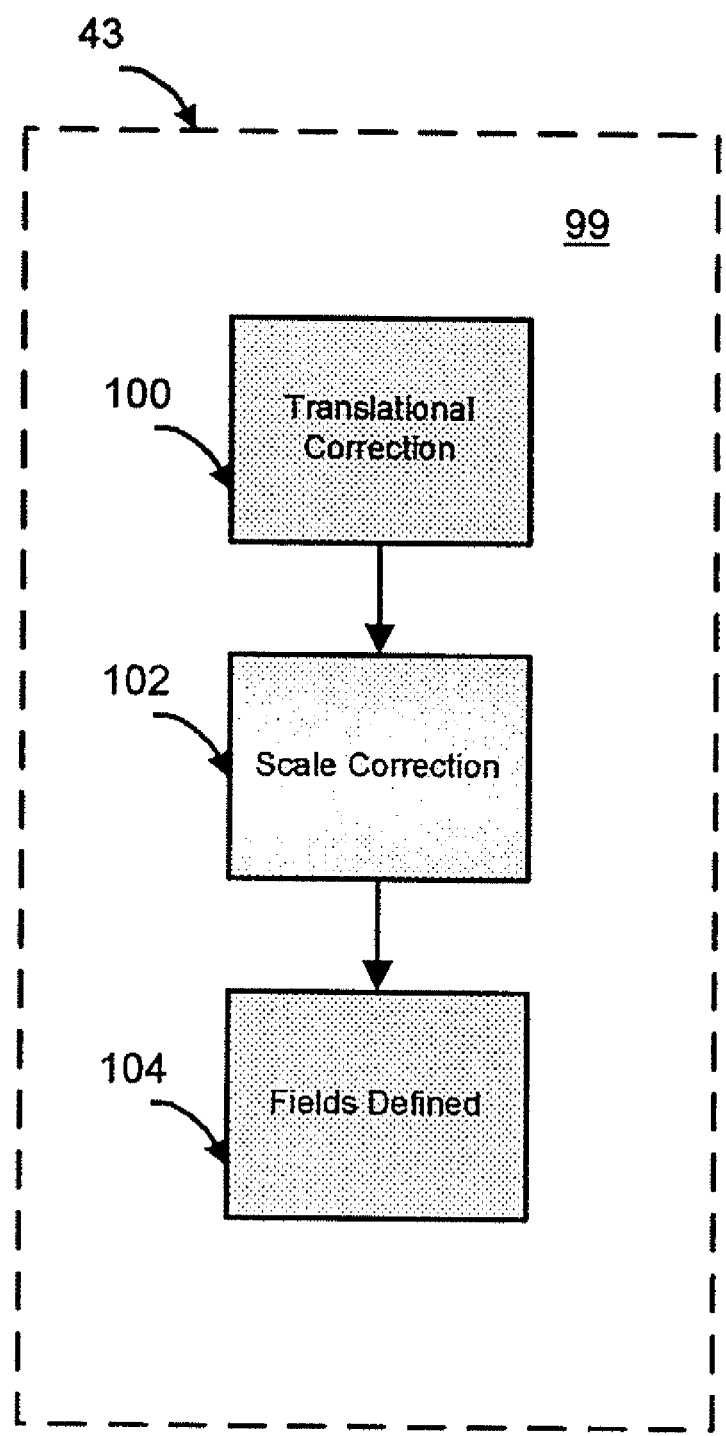
FIG. 6 illustrates a process carried out to define document fields, including translational and scale correction.

FIG. 6 illustrates a process 99 of step 43 carried out by the computer 10. In the first step of process 99, the business document image 28 is vertically and horizontally translated to match a document template (step 100). The business document image 28 is scaled to match the document template (step 102). Then the set of variable fields 72 are defined by the computer 10 in the business document image 28 (step 104).

Figure 7:
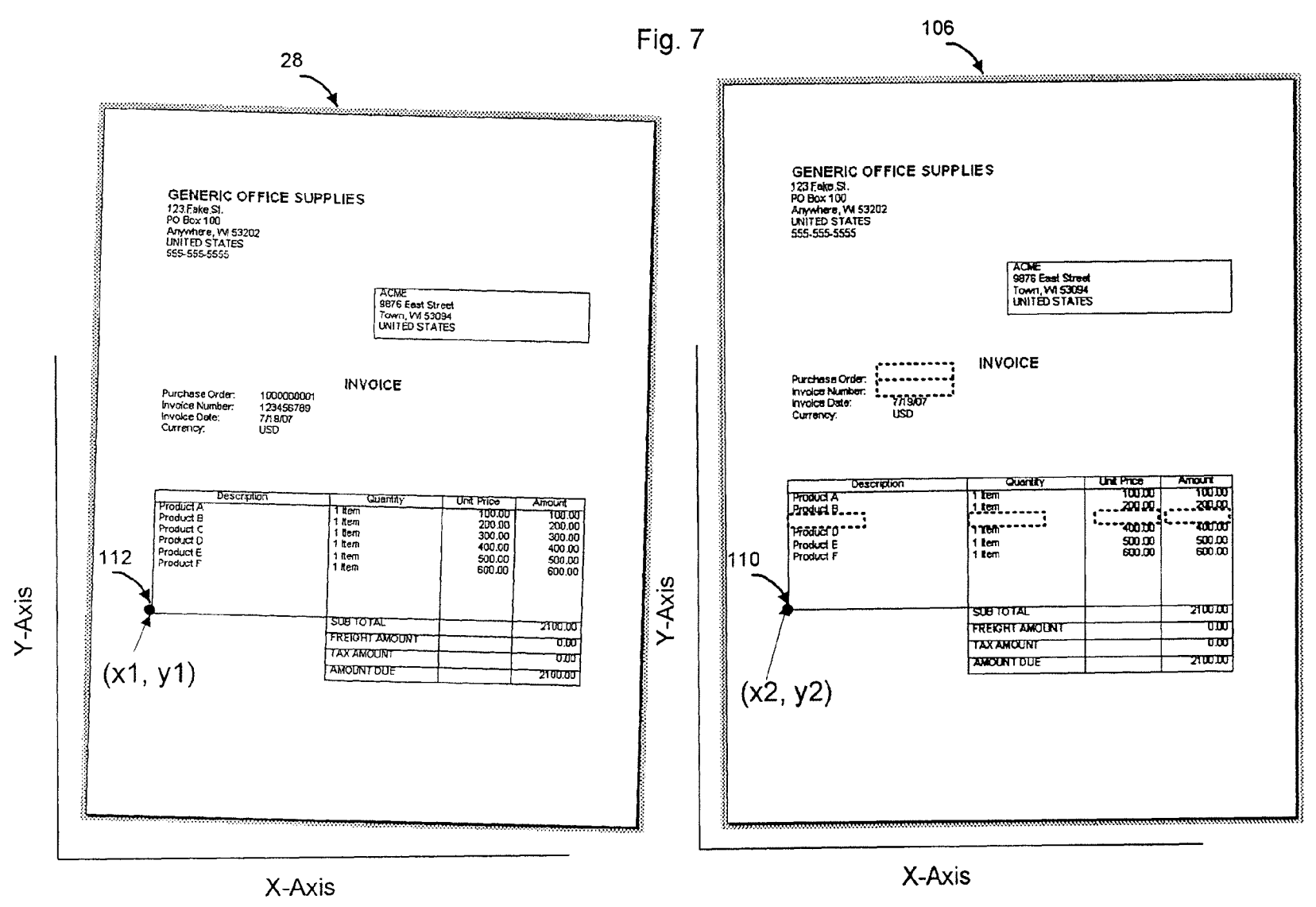

FIG. 7 illustrates actions carried out by the computer 10 during step 100 of process 99. After a successful template comparison, the business document image 28 is translated with respect to the document template 106. Each static field in the set of static fields 84 (FIG. 5) of the document template 106 is identified with a set of document-template, static-field Cartesian coordinates. Each static field in the set of static fields 84 (FIG. 5) of the business document image 28 is then identified with a set of business-document-image, static-field Cartesian coordinates. The computer 10 identifies the static field 110 in the document template 106 with the smallest set of Cartesian coordinates. The computer 10 also identifies the static field 112 in the business document image 28 with the smallest set of Cartesian coordinates. The smaller of the document template 106 and the business document image 28 is identified by a comparison of 1) the static field 110 in the document template 106 with the smallest set of Cartesian coordinates and 2) the static field 112 in the business document image 28 with the smallest set of Cartesian coordinates. The smaller of the document template 106 and the business document image 28 is a first result. The larger of the document template 106 and the business document image 28 is a second result. The static field with the smallest set of Cartesian coordinates of the first result is subtracted from the static field with the smallest set of Cartesian coordinates of the second result to create a translation correction vector. The translation correction vector is then applied to the set of business-document-image, static-field Cartesian coordinates to create a set of translation-corrected, business-document-image, static-field Cartesian coordinates.

Figure 8:
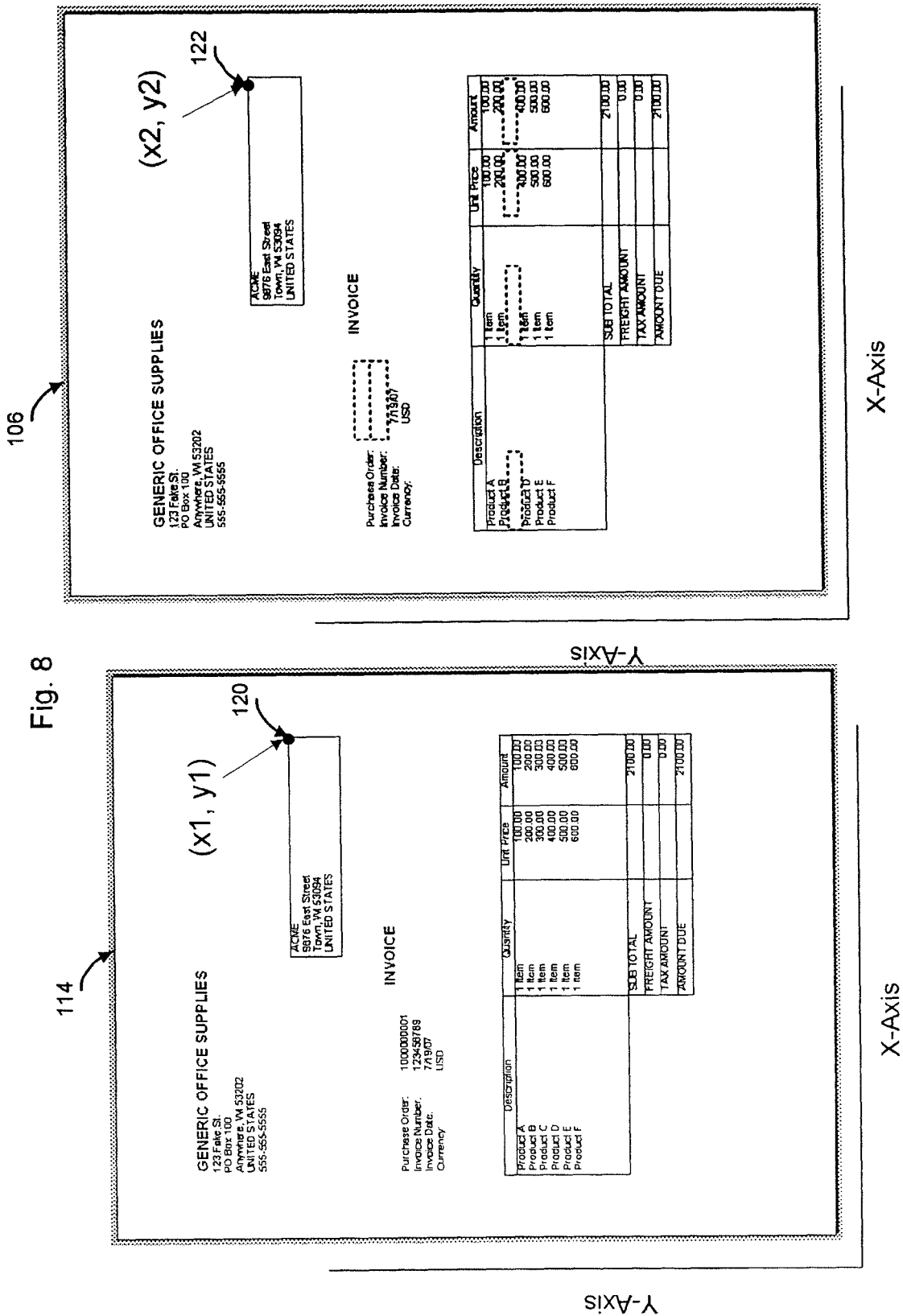
FIG. 8 illustrates actions carried out by the computer during scale correction.

FIG. 8 illustrates actions carried out by the computer 10 during step 102 of process 99. A translation-corrected, business-document image 114 is created from the set of translation-corrected, business-document-image, static-field Cartesian coordinates. After the translation-corrected, business-document image 114 has been created, it is scaled with respect to the document template 106. The computer 10 identifies the static field 120 in the translation-corrected image 114 with the largest set of Cartesian coordinates. The computer 10 then identifies the static field 122 in the document template 106 with the largest set of Cartesian coordinates. The static field with the largest set of Cartesian coordinates of the first result is subtracted from the static field with the largest set of Cartesian coordinates of the second result to create a scale correction vector. The scale correction vector is then applied to the set of translation-corrected, business-document-image, static-field Cartesian coordinates to create a set of translation- and scale-corrected, business-document-image, static-field Cartesian coordinates.

Figure 9:
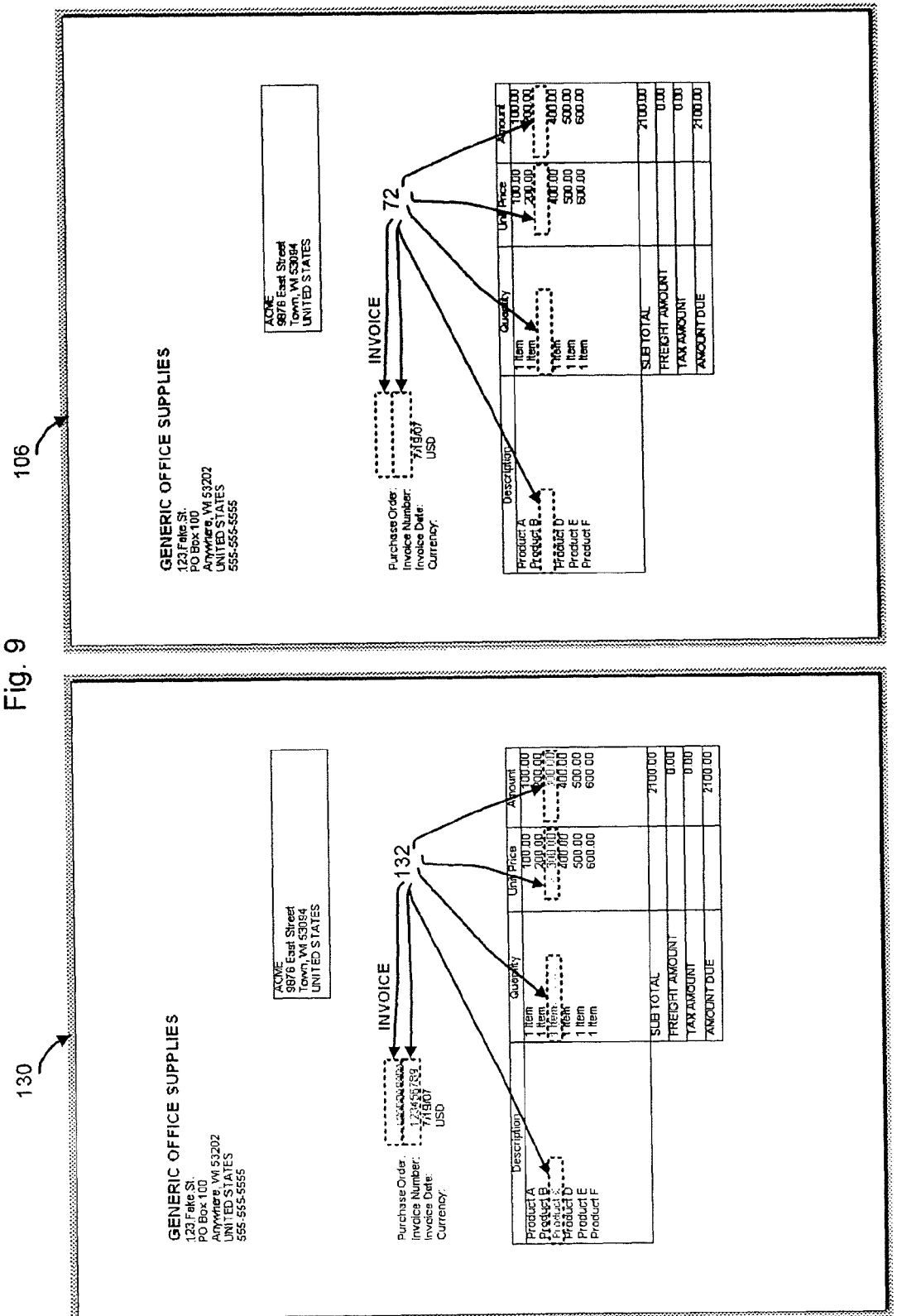
FIG. 9 illustrates actions carried out by the computer during document field extraction.

FIG. 9 illustrates actions carried out by the computer 10 during step 104 of process 99. A translation- and scale-corrected, business-document-image 130 is created from the set of translation- and scale-corrected, business-document-image, static-field Cartesian coordinates. After the image 130 has been created, the computer 10 identifies the set of variable fields 72 in the image 130 as a set of computer-defined document fields 132 for extraction. The set of computer-defined document fields 132 are defined using the set of translation- and scale-corrected, business-document-image, Cartesian coordinates and the set of document-template, static-field Cartesian coordinates. After the fields 132 have been defined, they are extracted from the document.

Figure 10A:
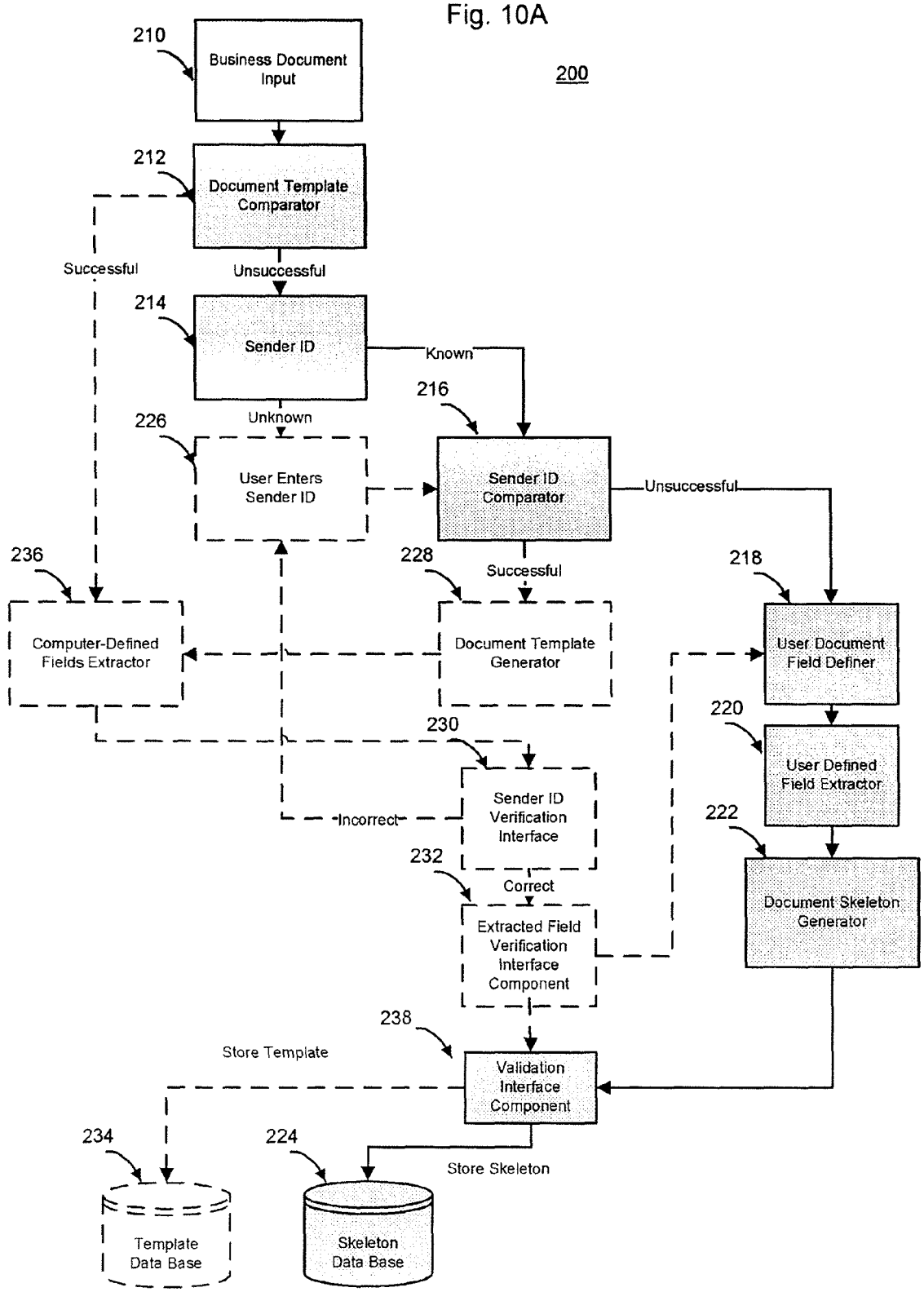
FIG. 10A illustrates a process carried out upon a first occurrence of a business document when a sender ID is known.
Figure 10B:
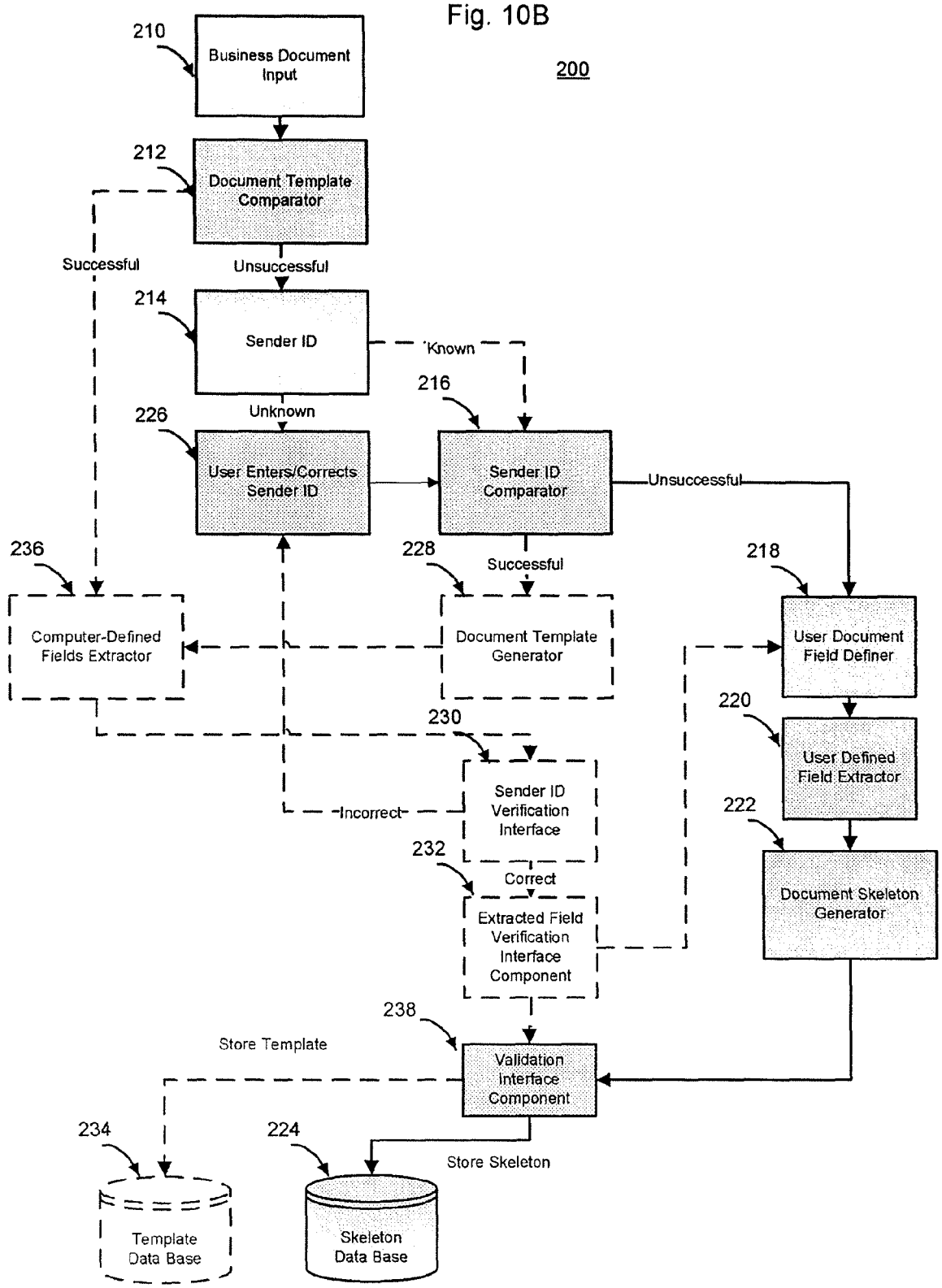
FIG. 10B illustrates a process carried out upon a first occurrence of a business document when a sender ID is unknown.
Figure 10C:
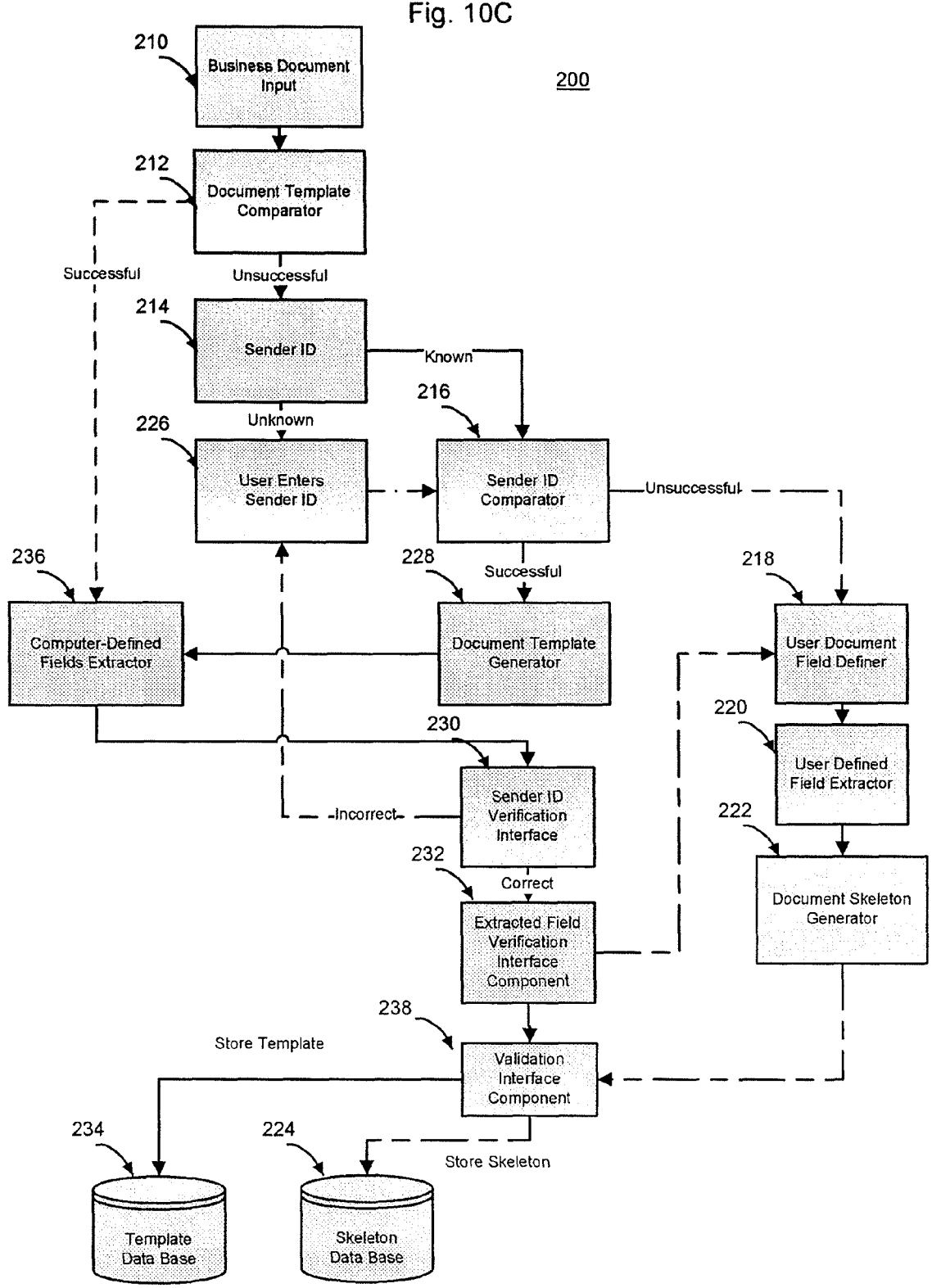
FIG. 10C illustrates a process carried out upon a second occurrence of a business document when a sender ID is known.
Figure 10D:
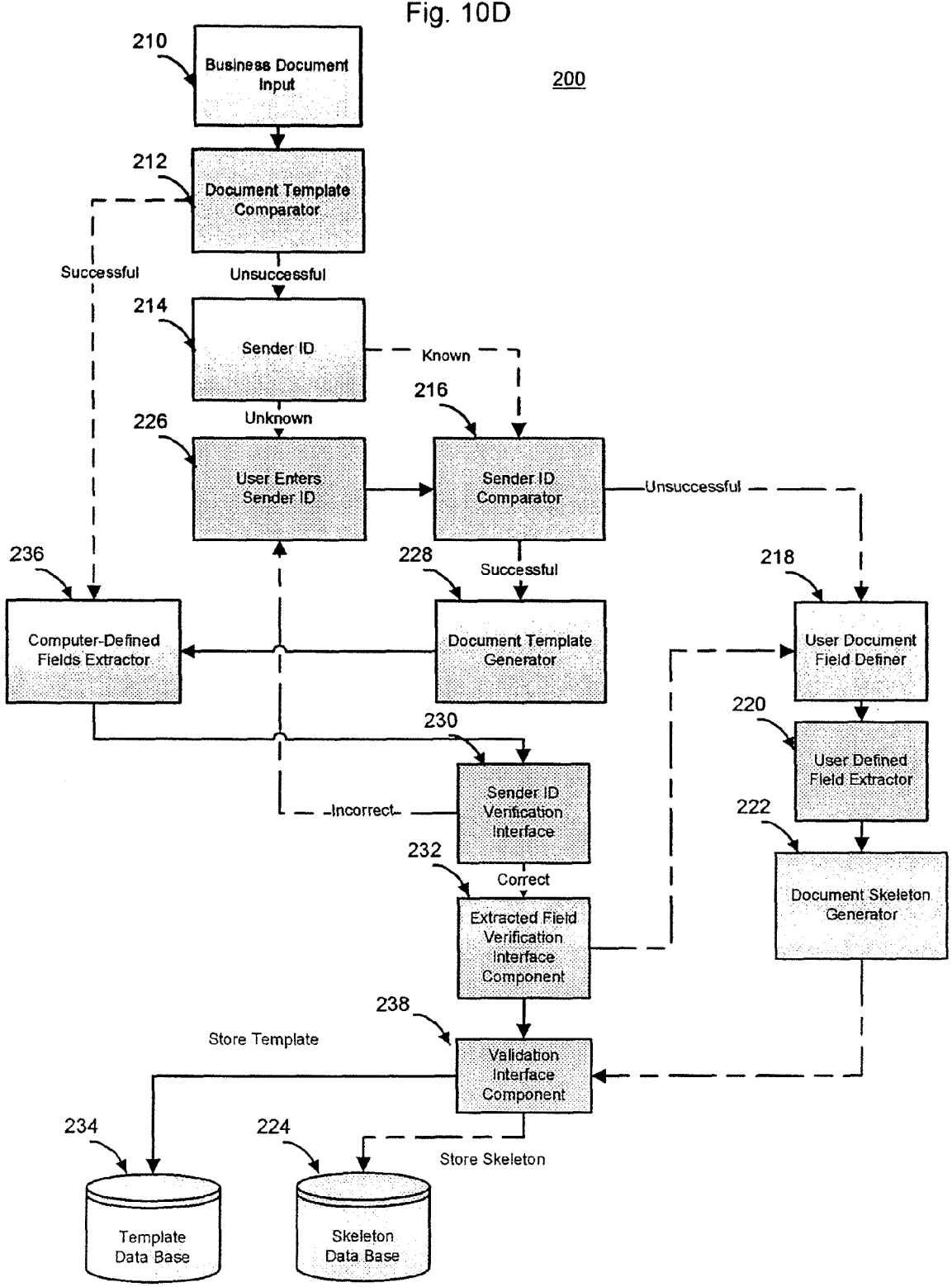
FIG. 10D illustrates a process carried out upon a second occurrence of a business document when a sender ID is unknown.
Figure 10E:
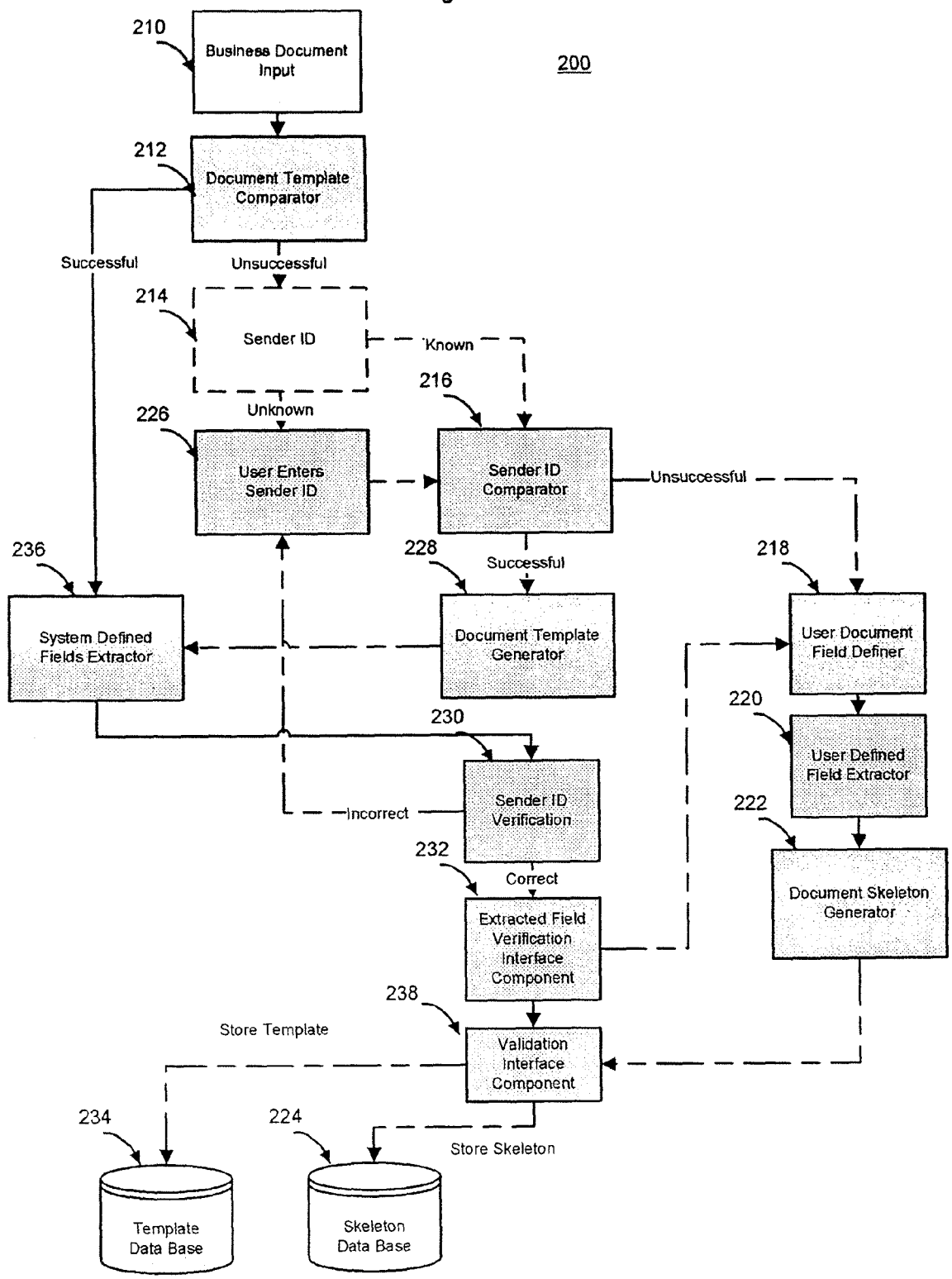
FIG. 10E illustrates a process carried out upon a third occurrence of a business document.

In another embodiment, the computer 10 searches for a document skeleton by identifying a sender ID. FIGS. 10A-10E illustrate a process 200 carried out by the computer 10. Like process 40, process 200 depends on the number of times the system 8 has encountered the business document (or document of the same type). FIGS. 10A and 10B illustrate the process 200 for a first occurrence of a business document. FIGS. 10C and 10D illustrate the process 200 for a second occurrence of a business document. FIG. 10E illustrates the process 200 for a third occurrence of a business document. Process 200 differs from process 40 in that a document skeleton comparison is conducted based on sender ID. In this embodiment, the sender ID is included in the first two occurrences of a business document. The sender ID can be entered by a user or automatically retrieved from the business document. For example, in a facsimile message, a sender ID could be retrieved automatically using the sender's facsimile number. In which case, the computer 10 could match the facsimile number to an individual or entity by, for example, using a lookup table.

In FIG. 10A, the process 200 begins when a business document image 28 is input into the system (step 210). The business document image 28 is then compared in a document template comparator (step 212). If step 212 results in an unsuccessful comparison, the computer 10 checks to see if the sender ID is known (step 214). If the sender ID is known, the business document image 28 is then compared in a sender ID comparator (step 216). The sender ID comparator compares the sender ID of the business document image with the sender IDs of document skeletons in the skeleton database. If step 216 results in an unsuccessful sender ID comparison, the document fields are defined in a user document field definer (step 218). The user defined document fields are then extracted in a user defined fields extractor (step 220). After step 220, a document skeleton is generated in a document skeleton generator (step 222). After step 222, the user validates the business document using a validation interface component (step 238). The document skeleton is then stored in a skeleton database (step 224).

FIG. 10B illustrates the process 200 under circumstances where the sender ID is unknown to the computer 10. As previously described, the process 200 begins when a business document image 28 is input into the system (step 210). The business document image 28 is then compared in a document template comparator (step 212). If step 212 results in an unsuccessful comparison, the computer 10 checks to see if the sender ID is known (step 214). If the sender ID is unknown, the user can enter an appropriate sender ID (step 226). The business document image 28 is then compared in the sender ID comparator (step 216). If step 216 results in an unsuccessful sender ID comparison, the document fields are defined in a user document field definer (step 218). The user defined document fields are then extracted in a user defined fields extractor (step 220). After step 220, a document skeleton is generated in a document skeleton generator (step 222). After step 222, the user validates the business document using the validation interface component (step 238). The document skeleton is then stored in the skeleton database (step 224).

FIG. 10C illustrates the process 200 under circumstances where the sender ID comparison is successful. As noted, if the sender ID is known, the business document image 28 is compared in the sender ID comparator (step 216). If step 216 results in a successful comparison, then a document template is generated in a document template generator (step 228). The computer-defined document fields are extracted in the computer-defined fields extractor (step 236). After step 236, the sender ID is verified in the sender ID verification interface (step 230). Such an interface may be a GUI, a real or virtual button, a wireless communication interface, a switch, a lever, or the like that provides an input mechanism for the user to indicate that there is an appropriate relationship between the document and the sender ID. If the sender ID is incorrect, the user may enter a correct sender ID (step 226). The business document image 28 is then compared in the sender ID comparator (step 216). If step 216 results in an unsuccessful comparison, process 200 follows steps 218, 220, 222, 238, and 224 as described for FIGS. 10A and 10B. If step 216 results in a successful comparison, then a new document template is generated in a document template generator (step 228). The computer-defined document fields are extracted in the computer-defined fields extractor (step 236). After step 236, the sender ID is again verified in the sender ID verification interface (step 230). After step 230, the set of extracted document fields are verified using an extracted field verification interface component (step 232). If not all extracted document fields are extracted at the correct position, additional document fields are defined in the user document field definer (step 218). The additional user defined document fields are then extracted in the user defined fields extractor (step 220). After step 220, a new document skeleton is generated in the document skeleton generator (step 222). After step 222, the user validates the business document using the validation interface component (step 238). Then the new document skeleton is stored in the skeleton database (step 224). If all extracted document fields are extracted at the correct position, the user validates the business document using the validation interface component (step 238). The document template is then stored in a template database (step 234).

FIG. 10D illustrates the process 200 under circumstances where the sender ID is unknown to the computer 10. If the sender ID is unknown, the user may enter an appropriate sender ID (step 226). The business document image 28 is then compared in the sender ID comparator (step 216). If step 216 results in a successful comparison, a document template is generated in a document template generator (step 228). The computer-defined document fields are extracted in the computer-defined fields extractor (step 236). After step 236, the sender ID is verified in the sender ID verification interface (step 230). If the sender ID is incorrect, the user may enter a new sender ID (step 226). The new sender ID is then compared in the sender ID comparator (step 216). If step 216 results in an unsuccessful comparison, process 200 follows steps 218, 220, 222, 238, and 224 as described for FIGS. 10A and 10B. If step 216 results in a successful comparison, then a new document template is generated in a document template generator (step 228). The computer-defined document fields are extracted in the computer-defined field extractor (step 236). After step 236, the sender ID is again verified in the sender ID verification interface (step 230). After step 230, the set of extracted document fields are verified using the extracted field verification interface component (step 232). If not all extracted document fields are extracted at the correct position, additional document fields are defined in the user document field definer (step 218). The additional user defined document fields are then extracted in the user defined fields extractor (step 220). After step 220, a new document skeleton is generated in the document skeleton generator (step 222). After step 222, the user validates the business document using the validation interface component (step 238). Then the new document skeleton is stored in the skeleton database (step 224). If all extracted document fields are extracted at the correct position, then the user validates the business document using the validation interface component (step 238). The document template is then stored in a template database (step 234).

FIG. 10E illustrates the process 200 under circumstances where the template comparison is successful. As with situations described with regard to FIGS. 10A-10D, the process 200 begins when a business document image 28 is input into the system (step 210). The business document image is then compared in a document template comparator (step 212). If step 212 results in a successful comparison, a set of computer-defined document fields are extracted in the computer-defined field extractor (step 236). After step 236, the sender ID is verified in the sender ID verification interface (step 230). If the sender ID is incorrect, the user is asked to enter a new sender ID (step 226). The new sender ID is then compared in the sender ID comparator (step 216). If step 216 results in an unsuccessful comparison, process 200 follows steps 218, 220, 222, 238, and 224 as described for FIGS. 10A and 10B. If step 216 results in a successful comparison, a new document template is generated in a document template generator (step 228). The computer-defined document fields are extracted in the computer-defined fields extractor (step 236). After step 236, the sender ID is again verified in the sender ID verification interface (step 230). After step 230, the set of extracted document fields are verified using the extracted field verification interface component (step 232). If not all extracted document fields are extracted at the correct position, additional document fields are defined in the user document field definer (step 218). The additional user defined document fields are then extracted in the user defined fields extractor (step 220). After step 220, a new document skeleton is generated in the document skeleton generator (step 222). The user validates the business document using the validation interface component (step 238). The new document skeleton is then stored in the skeleton database (step 224). If all extracted document fields are extracted at the correct position, the user validates the business document using the validation interface component (step 238). If a document template was made, then the document template is stored in a template database (step 234).

Thus, the invention provides, among other things, document recognition systems and methods in which documents can be recognized without the need to rely on large catalogs of information. In certain embodiments, a document template can be generated after analyzing just two documents of the same document type. In another embodiment, a document template can be generated after analyzing as few as two instances of document images of the same type.

Various features and advantages of the invention are set forth in the following claims.

What is claimed is:

1. A computer-implemented method of recognizing a document and extracting at least one variable document field within the document, the method comprising:
    receiving a first document image corresponding to a first instance of the document;
    automatically identifying one or more document fields of the first document image;
    comparing the one or more identified document fields of the first document image to a plurality of document templates stored in a document template database, the plurality of document templates each including one or more static document fields;
    comparing, following an unsuccessful comparison of the one or more document fields to the plurality of document templates, the one or more document fields of the first document image to at least one document skeleton stored in a document skeleton database, the at least one document skeleton including one or more static document fields;
    defining, following an unsuccessful comparison of the one or more document fields to the at least one document skeleton, one or more user-identified variable document fields within the first document image for extraction;
    extracting the defined one or more variable document fields from the first document image to obtain a set of extracted variable document fields;
    identifying a set of static document fields within the first document image based on the set of extracted variable document fields;
    generating a document skeleton based on the identified set of static document fields after the first instance of the document;
    storing the generated document skeleton in the document skeleton database;
    receiving a second document image corresponding to a second instance of the document;
    automatically identifying one or more document fields of the second document image;
    comparing the one or more identified document fields of the second document image to the plurality of document templates stored in the document template database;
    comparing, following an unsuccessful comparison of the one or more identified document fields of the second document image to the plurality of document templates, the one or more identified document fields of the second document image to the at least one document skeleton in the document skeleton database;
    automatically generating, following a successful comparison of the one or more identified document fields of the second document image to the at least one document skeleton, a document template based on the comparison of the second document image to the at least one document skeleton in the document skeleton database only after the second instance of the document;
    automatically extracting the one or more variable document fields based on the generated document template following receiving the second instance of the document; and
    storing the generated document template in the document template database.

2. A method as claimed in claim 1, further comprising: scanning the document to create the first document image.

3. A method as claimed in claim 1, further comprising: determining a sender ID; and
comparing the sender ID to sender IDs of document skeletons in the document skeleton database.

4. A method as claimed in claim 1, further comprising: adjusting the first document image by a scale factor; and adjusting the first document image by translation.

5. A method as claimed in claim 1, further comprising: identifying each static field of the second document image with a set of Cartesian coordinates; and
identifying each static field of the generated document template with a set of Cartesian coordinates.

6. A method as claimed in claim 5, further comprising: identifying the static field in the second document image that has the smallest set of Cartesian coordinates;
identifying the static field in the generated document template that has the smallest set of Cartesian coordinates;

identifying the static field in the second document image that has the largest set of Cartesian coordinates; and
identifying the static field in the generated document template that has the largest set of Cartesian coordinates.

7. A method as claimed in claim 6, further comprising:
identifying the smaller of the document template and the second document image to create a first result; and
identifying the larger of the document template and the second document image to create a second result.

8. A method as claimed in claim 7, further comprising:
subtracting the coordinates of the static field with the smallest set of Cartesian coordinates of the first result from the coordinates of the static field with the smallest set of Cartesian coordinates of the second result to create a translation correction vector.

9. A method as claimed in claim 8, further comprising:
applying the translation correction vector to each set of static field Cartesian coordinates associated with the second document image.

10. A method as claimed in claim 7, further comprising:
subtracting the coordinates of the static field with the largest set of Cartesian coordinates of the first result from the coordinates of the static field with the largest set of Cartesian coordinates of the second result to create a scale correction vector.

11. A method as claimed in claim 10, further comprising:
applying the scale correction vector to each set of static field Cartesian coordinates associated with the second document image.

12. A document recognition system for recognizing a document and extracting at least one variable document field within the document, the system comprising:
a user input device;
a document input device configured to generate a first document image corresponding to a first instance of the document and generate a second document image corresponding to a second instance of the document;
a display; and
a computer connected to the user input device, the document input device, and the display, the computer configured to
automatically identify one or more document fields of the first document image;
compare the one or more identified document fields of the first document image to a plurality of document templates stored in a document template database, the plurality of document templates each including one or more static document fields;
compare, following an unsuccessful comparison of the one or more document fields to the plurality of document templates, the one or more document fields of the first document image to at least one document skeleton stored in a document skeleton database, the at least one document skeleton including one or more static document fields;
define, following an unsuccessful comparison of the one or more document fields to the at least one document skeleton, one or more user-identified variable document fields within the first document image for extraction;
extract the defined one or more variable document fields from the first document image to obtain a set of extracted variable document fields;
identify a set of static document fields within the first document image based on the set of extracted variable document fields;
generate a document skeleton based on the identified set of static document fields after the first instance of the document;
store the generated document skeleton in the document skeleton database;
automatically identify one or more document fields of the second document image;
compare the one or more identified document fields of the second document image to the plurality of document templates stored in the document template database;
compare, following an unsuccessful comparison of the one or more identified document fields of the second document image to the plurality of document templates, the one or more identified document fields of the second document image to the at least one document skeleton in the document skeleton database;
automatically generate, following a successful comparison of the one or more identified document fields of the second document image to the at least one document skeleton, a document template based on the comparison of the second document image to the at least one document skeleton in the document skeleton database only after the second instance of the document;
automatically extract the one or more variable document fields based on the generated document template following receiving the second instance of the document; and
store the generated document template in the document template database.

13. A system as claimed in claim 12, wherein the computer is further configured to determine whether the first document image and the second document image are substantially similar to a document template stored in the template database.

14. A system as claimed in claim 13, wherein the computer is further configured to
determine a sender ID; and
compare the sender ID to sender IDs of document skeletons in the document skeleton database.

15. A system as claimed in claim 14, wherein the computer is further configured to adjust the image by a scale factor; and adjust the image by translation.

16. A document recognition system comprising:
a user input device;
a display; and
a computer connected to the user input device and the display, the computer configured to
automatically identify one or more document fields of a first document image corresponding to a first instance of a document;
compare the one or more identified document fields of the first document image to a plurality of document templates stored in a document template database, the plurality of document templates each including one or more static document fields;
compare, following an unsuccessful comparison of the one or more document fields to the plurality of document templates, the one or more document fields of the first document image to at least one document skeleton stored in a document skeleton database, the at least one document skeleton including one or more static document fields;
define, following an unsuccessful comparison of the one or more document fields to the at least one document skeleton, one or more user-identified variable document fields within the first document image for extraction;
extract the defined one or more variable document fields from the first document image to obtain a set of extracted variable document fields;
identify a set of static document fields within the first document image based on the set of extracted variable document fields;
generate a document skeleton based on the identified set of static document fields after the first instance of the document;
store the generated document skeleton in the document skeleton database;
automatically identify one or more document fields of a second document image corresponding to a second instance of the document;
comparing the one or more identified document fields of the second document image to the plurality of document templates stored in the document template database;
compare, following an unsuccessful comparison of the one or more identified document fields of the second document image to the plurality of document templates, the one or more identified document fields of the second document image to the at least one document skeleton in the document skeleton database;
automatically generate, following a successful comparison of the one or more identified document fields of the second document image to the at least one document skeleton, a document template based on the comparison of the second document image to the at least one document skeleton in the document skeleton database only after the second instance of the document;
automatically extract the one or more variable document fields based on the generated document template following receiving the second instance of the document; and
store the generated document template in the document template database.

* * * * *